United States Patent
Brogan et al.

(10) Patent No.: US 8,907,509 B2
(45) Date of Patent: Dec. 9, 2014

(54) CURRENT CONTROLLER DEVICE AND VECTOR CONTROL METHOD FOR CONTROLLING POWER CONVERSION

(75) Inventors: Paul Brian Brogan, Glasgow (GB); Rodney Jones, Stoke on Trent (GB)

(73) Assignee: Siemens Aktiengesellschaft, Munich (DE)

( * ) Notice: Subject to any disclaimer, the term of this patent is extended or adjusted under 35 U.S.C. 154(b) by 836 days.

(21) Appl. No.: 13/014,117

(22) Filed: Jan. 26, 2011

(65) Prior Publication Data

US 2011/0182093 A1 Jul. 28, 2011

(30) Foreign Application Priority Data

Jan. 28, 2010 (EP) .................................. 10000878

(51) Int. Cl.
*H02P 9/00* (2006.01)
*H02M 1/12* (2006.01)
*H02M 5/458* (2006.01)

(52) U.S. Cl.
CPC .............. *H02M 1/12* (2013.01); *H02M 5/4585* (2013.01)
USPC .............................................. 290/43; 363/16

(58) Field of Classification Search
USPC ................ 363/16–20, 91; 318/727, 798, 759, 318/800–806, 809–810; 290/43, 44, 55; 323/207, 222, 235, 271, 284, 286
See application file for complete search history.

(56) References Cited

U.S. PATENT DOCUMENTS

| 3,566,243 | A | * | 2/1971 | Landis | 363/37 |
| 5,083,039 | A | | 1/1992 | Erdman | |
| 5,184,055 | A | * | 2/1993 | Ohishi et al. | 318/615 |
| 5,570,276 | A | * | 10/1996 | Cuk et al. | 363/16 |
| 5,982,645 | A | * | 11/1999 | Levran et al. | 363/37 |
| 6,046,554 | A | * | 4/2000 | Becerra | 318/400.34 |
| 6,566,764 | B2 | * | 5/2003 | Rebsdorf et al. | 290/44 |
| 7,026,784 | B2 | * | 4/2006 | Shimizu et al. | 318/400.26 |

(Continued)

FOREIGN PATENT DOCUMENTS

CN 1851998 A 10/2006
WO WO 2007054729 A1 5/2007

OTHER PUBLICATIONS

Wei Qiao, Ronald G. Harley: "Improved Control of DFIG Wind Turbines for Operation with Unbalanced Network Voltages", Industry Applications Society Annual Meeting 2008, IEEE, Piscataway, NJ, USA, pp. 1-7, XP031353877.

(Continued)

*Primary Examiner* — Rajnikant Patel (57) ABSTRACT

A current controller device using a vector control algorithm for controlling conversion of DC power into AC power is provided. The controller device has an open loop control loop gain and produces a first and a second voltage demand signals based on a first and a second current demand signals, a first and a second current feedback signals, a first and a second voltage feedback signals. The open loop control loop gain depends on frequencies of the first and second current feedback signals. A first and a second filters are provided at a first and a second current feedback inputs respectively. The first and second filters each have a filter characteristics to reduce the frequencies of the first and second current feedback signals at which the open loop control loop gain is greater than unity and has a phase less than or equal to minus 180°.

19 Claims, 8 Drawing Sheets

(56) References Cited

U.S. PATENT DOCUMENTS

| | | | |
|---|---|---|---|
| 7,030,596 B1* | 4/2006 | Salerno et al. | 323/282 |
| 7,332,894 B2* | 2/2008 | Ichinose et al. | 322/29 |
| 7,511,385 B2* | 3/2009 | Jones et al. | 290/43 |
| 7,560,909 B2* | 7/2009 | Coleman | 323/222 |
| 2007/0121354 A1 | 5/2007 | Brogan | |
| 2008/0025050 A1* | 1/2008 | Spindler | 363/15 |
| 2008/0205096 A1* | 8/2008 | Lai et al. | 363/40 |
| 2009/0147549 A1 | 6/2009 | Brogan | |

OTHER PUBLICATIONS

M. Malinkowski et al: "Sensorless Operation of Active Damping Methods for Three-Phase PWM Converters", Industrial Electronics, 2005. Proceedings of the IEEE Inter National Symposium on Dubrovnik, Croatia, vol. 2, pp. 775-780, XP010850175.

* cited by examiner

CURRENT CONTROLLER DEVICE AND VECTOR CONTROL METHOD FOR CONTROLLING POWER CONVERSION

CROSS REFERENCE TO RELATED APPLICATIONS

This application claims priority of European application No. 10000878.9 filed Jan. 28, 2010, which is incorporated by reference herein in its entirety.

FIELD OF THE INVENTION

The present invention relates to a current controller device using a vector control algorithm for controlling conversion of DC power into AC or vice versa power by a converter, the controller having a frequency dependent open loop control loop gain. The invention further relates to a power converter, to an electrical energy generating equipment such as, for example, a wind turbine, to an electrical energy generating installation such as, for example, a wind farm and to a vector control method for controlling a converter converting DC power to AC power or vice versa.

BACKGROUND OF THE INVENTION

Wind turbines convert wind energy to electrical energy by using the wind to drive the rotor of generator, either directly or by means of a gear box. The frequency of the AC power that is developed at the stator terminals of the generator is directly proportional to the speed of rotation of the rotor. The voltage at the generator terminals also varies as function of speed and, depending on the particular type of generator, on the flux level. For optimum power, the speed of rotation of the output shaft of the wind turbine will vary according to the speed of the wind driving the wind turbine blades. To limit the power at high wind speed, the speed of rotation of the output shaft is controlled by altering the pitch of the turbine blades.

Power converters are, for example, used for matching the variable frequency AC power provided by the generator to the nominally constant frequency AC power of the grid. In a first stage of such a power converter a rectifier is used to convert the AC power delivered from the generator to a DC power. This DC power is fed to a so called DC link. In a second stage, called inverter, the inputs of which are connected to the DC link, the DC power is converted to an AC power matching the grid frequency.

In general, the inverters are circuits used for converting DC power to AC power. They are equipped with switches for connecting the inverter phase terminal outputs to the positive or negative busbar of the DC link. The switching pattern for opening and closing the switches is provided on the basis of a pulse width modulation scheme which defines the timing for connecting the inverter outputs to the high or the low DC voltage level through the respective switches. During the times in which a switch is open a current flows from the DC link to the grid or vice versa. Other methods for determining the switching regime for the switches including direct control or predictive control are also applicable.

The inverter may be controlled according to a power factor demand signal representing a power factor requested by the grid operator, where the power factor is given by the ratio of the real power to the apparent power (the apparent power is the square root of the sum of the squares of the real power and the reactive power). Instead of controlling the inverter according to a power factor demand the inverter can also be controlled on the basis of a real power demand and a reactive power demand. Furthermore, instead of controlling the inverter directly according to a power factor demand, or a real power demand and reactive power demand, it can also be controlled according to current demand signals since the voltage amplitude is usually a fixed parameter in the grid so that the power fed to the grid by the inverter can be defined by current amplitudes and phase angles between the current and the voltage. Hence, a power factor demand signal or demand signals for active and reactive power can be converted to current demand signals which are then used for controlling the inverter, i.e. for determining the pulses defining the switching times of the switches. Such mode of control is known as current control.

Figure 10:
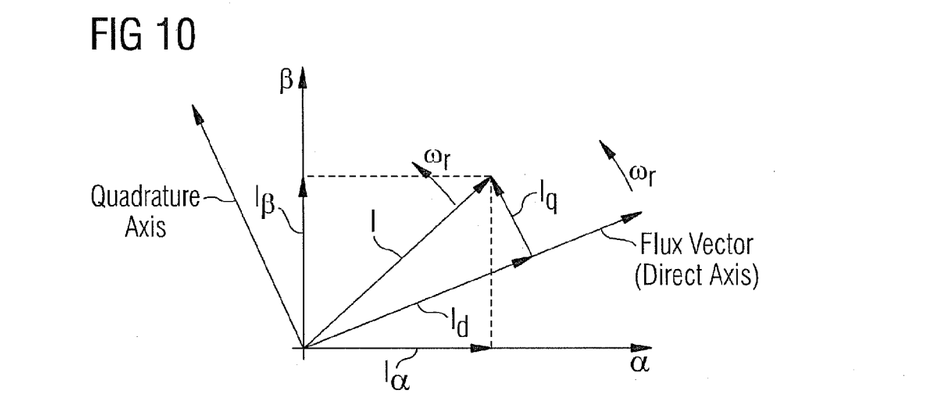
FIG. 10 is a diagram illustrating a current vector in a fixed coordinate system and a rotating field coordinate system.

In particular, in the current control mode a vector control algorithm may advantageously be used for controlling conversion of DC power into AC power. Balanced alternating feedback signals, acquired in a stationary reference frame, can be represented as components $I_\alpha$ and $I_\beta$ of vectors I rotating with a rotational frequency $\omega_r$ with respect to the stationary reference frame $\alpha,\beta$ (compare FIG. 10). In a vector control algorithm, these rotating vectors I are represented in a rotating reference frame rotating with the flux vector of the rotor or a vector rotating with the grid voltage (synchronised to the grid voltage) and the control quantities are calculated in this rotating reference frame based on current demand signals. In such a rotating reference frame a balanced three phase AC current I can be defined by two vectors vector components $I_d$, $I_q$ representing a current $I_d$ flowing in the direction of the flux vector, i.e. the so called direct axis of the rotating reference frame, and a current $I_q$ flowing perpendicular to the direction of the flux vector, i.e. in the direction of the so called quadrature axis of the rotating reference frame. While the current $I_d$ flowing in the direction of the flux vector or the vector rotating with the grid voltage is called direct axis current the current $I_q$ flowing perpendicular to the flux vector or the vector rotating with the grid voltage is called quadrature axis current. The direct axis current and the quadrature axis current are DC quantities in the steady state, and the state error is controlled to zero, typically by means of a PI controller.

Typical power converters including a rectifier and an inverter for converting a variable frequency AC power of a wind turbine generator to a DC power and the DC power to an fixed frequency AC power of a grid on the basis of vector control algorithms are, for example, described in U.S. Pat. No. 5,083,039 and US 2009/0147549 A1.

The mentioned controllers typically have a frequency dependent open loop control loop gain. In case the open loop control loop gain is greater than unity and has a phase less than or equal to minus 180° the control system is defined to be unstable.

SUMMARY OF THE INVENTION

With respect to the mentioned prior art it is an objective of the present invention to provide a current controller device using a vector control algorithm for controlling conversion of DC power into AC power with enhanced stability as compared to the prior art. It is a further objective of the present invention to provide an advantageous power converter, an advantageous electrical energy generating equipment and an advantageous electrical energy generating installation. Furthermore, it is an objective of the present invention to provide an advantageous vector control method for controlling an inverter converting DC power to AC power.

The first objective is solved by a current controller, the second objective is solved by a power converter, an electrical energy generating equipment and an electrical energy generating installation, the third objective is solved by a vector control method. The depending claims contain further developments of the invention.

According to the invention, a vector control method for controlling a converter converting DC power to AC power or vice versa is provided, where the AC power is output to or received from a grid. The vector control calculates a first voltage demand signal and a second voltage demand signal on the basis of a first current demand signal, a second current demand signal, a first current feedback signal, a second current feedback signal, a first voltage feedback signal and a second voltage feedback signal. The open loop control loop gain depends on the frequencies contained in the first and second current feedback signals. According to the invention, the frequencies of the first and the second current feedback signals at which the open loop control loop gain would be greater than unity and would have a phase less than or equal to minus 180° are suppressed.

The inventive method is based on the following observations:

Grid connected inverters with fixed frequency pulse width modulation schemes can suffer from closed loop instability when connected to a grid like, for example, a wind farm type electrical collector system. Such collector systems, but also other grids, can have significant cable capacitance, and/or overhead lines, and can be connected to weak AC electrical systems. When viewed from the output terminals of the inverter this cable capacitance together with the input line reactor and turbine transformer from a series resonant circuit which has an impedance minimum at the (not intentionally) tuned frequency, which in turn results in a high admittance.

The closed loop current controller of the grid, or generator, connected inverter can be analysed by considering its open loop gain. This open loop gain, can be calculated from the product of the controller transfer function C(s), and the admittance Y(s) of the electrical grid, or generator. The controller transfer function C(s) is defined by the control algorithm used in the controller. In general fixed switching frequency schemes the controlling is performed in synchronicity with the rotating flux vector of the generator or synchronised to the grid voltage.

In such a fixed frequency pulse width modulation scheme a delay exists between sampling a current feedback and/or a voltage feedback and realising an output voltage of the inverter with which to control the current at the inverter output. This delay causes a phase characteristic that has increasing phase lag as frequency increases. The current control system is defined as being unstable if the open loop control loop gain is greater than unity when the phase of the open loop control loop gain is less than or equal to minus 180°.

In particular, if a large number of inverters is connected to a grid which has significant capacitance due to, for example, a collector system the admittance seen from the inverter output may become so high that the open loop control loop gain increases above unity and, at the same time, the phase of the open loop control loop gain is less than or equal to minus 180° for a certain frequency band or certain frequency bands. This combination would lead to instabilities of the control system in these frequency bands.

Although the above described difficulty would also arise, in general, with only a few inverters connected to a grid (for example two or three inverters) it becomes more severe with increasing numbers of inverters connected to the grid.

The issues described above becomes relevant if many high power converters are connected to a large cable array. Moreover, if the ratio of the installed apparent power to the grid fault level becomes high a secondary influence becomes relevant. These relations have not been regarded before since a large number of high power converters connected to a large cable array and high ratios between installed apparent power and grid fault level are only about to be reached at present so that the issues described above will become more relevant in the near future.

With the inventive vector control method, the control system can be stabilized by suppressing such frequencies of the first and second current feedback signals at which the open loop control loop gain of the vector control would be greater than unity and/or its phase would be less than or equal to minus 180°.

In case a plurality of electrical energy generating equipments is present, at least a subset of which is connected together by the grid, each of that plurality of electrical energy generating equipments converts DC power to AC power and comprises a reactor and a transformer. The grid has grid capacitance, e.g. the cable capacitance of a collector cable array. The frequencies of the first and current feedback signals at which the open control loop gain would be greater than unity and would have a phase less than or equal to minus 180° can be determined from the parameters of the reactors, the transformers, the grid capacitance and the grid impedance. In particular, the grid capacitance may be governed by the capacitance of at least one collector cable which is part of the grid and connects at least a subset of that plurality of electrical energy generating equipments to a central equipment.

Determining the frequencies can, in particular, be done by determining an admittance as seen from the output of the inverter from the parameters of the reactors, of the transformers and the cable capacitance. Then the open loop control gain of the is calculated from the product of the open loop gain, C(s), of the vector control method and the determined admittance, Y(s). The frequencies at which the open loop control loop gain is greater than unity and at which the phase is less than or equal to minus 180° can be determined from the result of the calculation.

The inventive vector control method can, in particular, be used in the context of electrical energy generating equipments which generate an AC power that is converted to a DC power before it is inverted again to an AC power.

A current controller device suitable for performing the inventive vector control method uses a vector control algorithm for controlling conversion of DC power into AC power or vice versa by a converter. It has a frequency dependent open loop control loop gain and comprises a first current demand input for receiving a first current demand signal, at least a second current demand input for receiving a second current demand signal, a first current feedback input for receiving a first current feedback signal representing AC current of the AC power, e.g. an AC current at a converter terminal, a second current feedback input for receiving a second current feedback signal representing an AC current of the AC power, e.g. an AC current at a converter terminal, a first voltage feedback input for receiving a first voltage feedback signal representing AC voltage of the AC power, e.g. an AC voltage at a converter terminal, a second voltage feedback input for receiving a second voltage feedback signal representing an AC voltage of the AC power, e.g. an AC voltage at a converter terminal, a first voltage demand output for outputting a first voltage demand signal, a second voltage demand output for outputting a second voltage demand signal and a controller for producing said first voltage demand signal and said second voltage demand signal on the basis of said first current demand signal, said second current demand signal, said first current feedback signal, said second current feedback signal, said first voltage feedback signal and said second voltage feedback signal. In the current controller, the open loop control loop gain depends on the frequencies contained in the first and second current feedback signals. A first filter is provided at the first current feedback input and a second filter is provided at the second current feedback input. Both filters each have a filter characteristics chosen such as to reduce frequencies of the first and the second current feedback signals at which the open loop control loop gain would become greater than unity and would have a phase less than or equal to minus 180° so that the open loop control loop gain in said certain frequencies is below unity and/or the phase related to said frequencies is shifted to above minus 180°.

As said first and second filters band-stop filters may be used, each having a centre frequency and a band width chosen such as to reduce frequencies of the first and second current feedback signals at which the frequency dependent open loop control loop gain would become greater than unity and would have a phase less than or equal to minus 180°.

In particular, such band-stop filters would typically have a centre frequency at or above 150 Hz, for example, at or above 400 Hz or at or above 600 Hz. In addition, such a band-stop filter would typically have a band width of at least 50 Hz and, in particular, of at least 200 Hz.

In case, there are different frequency ranges at which the open loop control loop gain would become greater than unity and would have a phase less than or equal to minus 180°, at least a third band-stop filter could be provided between the first current feedback input and the first band-stop filter, and at least a forth band-stop filter could be provided between the second current feedback input and the second band-stop filter. The third and forth band-stop filters would each have a centre frequency at or above 150 Hz and/or a band width of at least 50 Hz.

By using at least two band-stop filters for each current feedback signal different frequency bands which would lead to instabilities can be suppressed while, at the same time, not substantially suppressing such frequencies which would not lead to instabilities.

The controller can, in particular, comprise a first subtractor connected to the first current demand signal input and to the first current feedback input, the subtractor being adapted for forming a first error signal representing the difference between the first current demand signal and the first current feedback signal. Moreover such a current controller would comprise at least a second subtractor connected to the second current demand signal input and to the second current feedback input, the second subtractor being adapted for forming a second error signal representing the difference between the second current demand signal and the second current feedback signal. A first control unit, preferably a PI controller, is then connected to the first subtractor for receiving the first error signal and adapted for producing a first control signal based on the first error signal. At least a second control unit, preferably also a PI controller, is connected to the second subtractor for receiving the second error signal and adapted for producing a second control signal based on the second error signal. Furthermore, a first multiplier is connected to the first current demand signal input and adapted for producing a third control signal by multiplying the first current demand signal by at least a fundamental frequency and an inductance value, and at least a second multiplier is connected to the second current demand signal input and adapted for producing a forth control signal by multiplying the second current demand signal by at least a fundamental frequency and an inductance value. In addition, an adder arrangement is connected to the first control unit, to the second multiplier, to the first voltage feedback input and to the first voltage demand output. This first adder arrangement is adapted for producing the first voltage demand signal by adding the first control signal, the fourth control signal and the first voltage feedback signal. An adder/subtractor arrangement is connected to the second control unit to the first multiplier to the second voltage feedback input and to the second voltage demand output. The second adder arrangement is adapted for producing the second voltage demand signal by subtracting the third control signal from the second voltage feedback signal and adding the second control signal. In such a current controller device the first filter is located between the first current feedback input and the first subtractor and the second filter is located between the second current feedback input and the second subtractor.

The invention also provides a power converter comprising an inverter for converting DC power to AC power and an inventive current controller device for controlling the conversion of the DC power to the AC power. Due to the inventive current controller device the control system of the power converter shows enhanced stability. The inventive power converter may, in addition, comprise a rectifier for conversion of an AC power to said DC power. Such power converters can, in particular, be used where the generator produces an AC power of a first frequency (steady or variable) which is to be converted to an AC power of an second frequency.

An inventive power converter can, in particular, be used in an electrical energy generating equipment like photovoltaic cell or, in case the power converter includes a rectifier, an electrical energy generating equipment with an electrical generator generating AC power, such as a wind turbine generator or as an AC to AC interconnecting system between two AC electrical systems, which may or may not have nominally different fundamental frequencies.

According to a further aspect of the invention, an electrical energy generating installation is provided which comprises a plurality of electrical energy generating equipments like, for example, wind turbines each being equipped with a transformer, a reactor and a power converter including an inverter for conversion of DC power to AC power, and a current controller device for controlling the AC power output by the inverter. The installation further comprises a grid to which the electrical energy generating equipments are connected and which has a grid capacitance. The reactor of the electrical energy generating equipments, the transformers and the grid capacitance form a resonant circuit, the tuned frequency of which results in a high admittance which causes the open loop control loop gains of the inverter controllers to become greater than unity and to have phases less than or equal to minus 180°. In such an electrical energy generating installation inventive current controller devices are used as the current controller devices in the power converters of the energy generating equipments so that frequencies which would cause instabilities due to the mentioned resonant circuit can be suppressed.

In particular, the grid may comprise at least one collector cable connecting at least a subset of said plurality of electrical energy generating equipments to a central equipment of the energy generating installation such as, e.g., a main transformer connecting an internal grid to a utility grid, and having a cable capacitance where the grid capacitance is substantially given by the capacitance of the at least one collector cable. Such collector cables are typically used in large wind farms for connecting wind turbines to a central transformer. Moreover, power factor correction capacitors may be present which would have a similar effect as the cable capacitances.

Each electrical energy generating equipment may comprise an electrical generator generating AC power. In this case the power converter further comprises a rectifier for conversion of the generated AC power to said DC power. The use of the rectifier allows for generating an AC power the frequency of which does not match the frequency of the AC power in the grid. The combination of rectifier and inverter then allows for frequency conversion to match the AC power of the generator to the AC power of the grid. This stabilising method could also applied to HVDC schemes, where the AC, DC, AC converter offers interconnection between AC electrical system, rather than an interface between a generator and AC system as described above.

BRIEF DESCRIPTION OF THE DRAWINGS

Further features, properties and advantages of the present invention will become clear from the following description of embodiments in conjunction with the accompanying drawings.

DETAILED DESCRIPTION OF THE INVENTION

Figure 1:
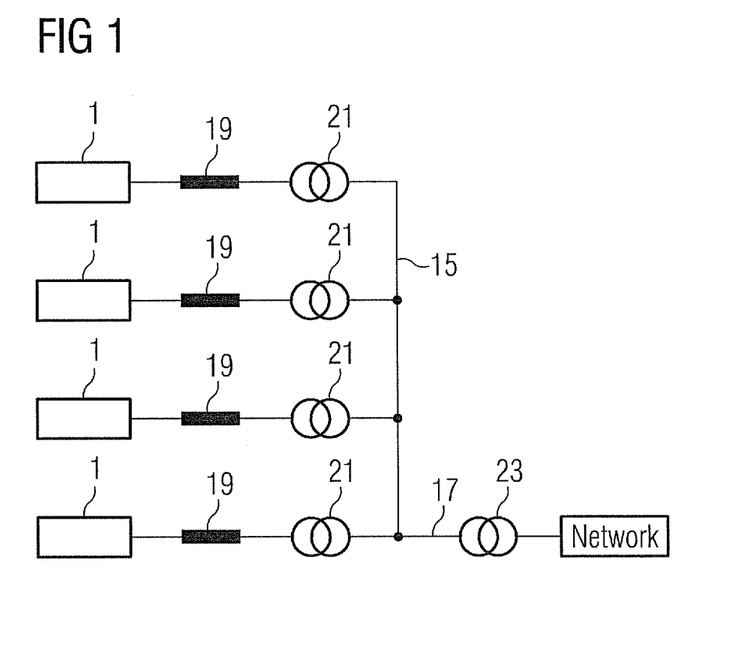
FIG. 1 schematically shows a typical configuration of a wind farm.

Typically, a number of wind turbines 1 are connected together to define a wind farm, as it is shown in FIG. 1. The wind turbines are connected in parallel to a wind farm transformer 23 by a collector cable 15. The wind farm transformer is in turn connected to a nominally fixed frequency utility grid 3 (labelled network in the Figure). Each wind turbine 1 is connected to the collector cable 15 through an input line reactor 19 and a wind turbine transformer 21.

Although only one collector cable 15 to which four wind turbines 1 are connected is shown in FIG. 1 the number of collector cables 15 as well as the number of wind turbines connected to a collector cable may differ from what is shown in FIG. 1. For example, large wind farms usually comprise more than one collector cable. In addition, the number of wind turbines connected to each collector cable 15 may be less than four or, in particular, greater than four.

Figure 2:
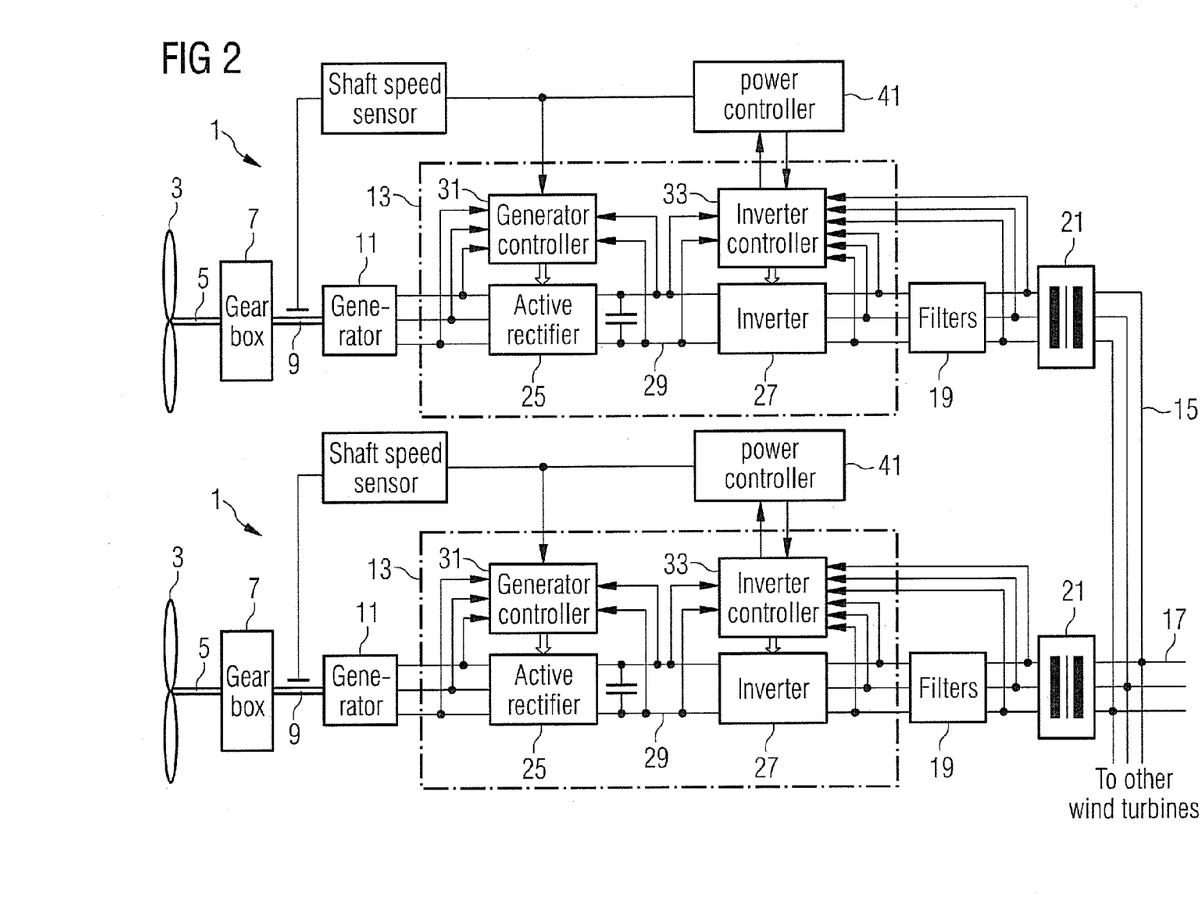
FIG. 2 shows for the electrical equipment of a wind turbine in detail.

FIG. 2 shows two of the wind turbines of FIG. 1 in more detail. In particular, the Figure shows the electrical equipment of the wind turbines for controlling the generator and the power output of the turbine.

Each wind turbine 1 comprises a rotor 3 with a rotor shaft 5 transmitting the rotational momentum of the turning rotor 3 to a gear box 7. In the gear box 7, a transmission of the rotation to an output shaft 9 with a certain transmission ratio takes place. The output shaft 9 is fixed to the rotor of an AC generator 11 which transforms the mechanical power provided by the rotation of the output shaft 9 into the electrical power. The AC generator 11 may either be a synchronous generator or an asynchronous generator (singly-fed or doubly-fed). In a synchronous generator, the rotor rotates with the same rotational frequency as a rotating magnetic field produced by a stator of the generator. In contrast, in an asynchronous generator, the rotational frequencies of the stator's magnetic field and the rotor are different. The difference in rotational frequency is described by the slip of the generator. The generators 11 are variable speed generators, i.e. the rotational speed of the rotor is allowed to vary depending on the wind conditions.

To provide a fixed frequency for the utility grid to which the wind turbines are connected, each wind turbine 1 is equipped with a power electronic converter 13 which converts parts or the whole of the varying frequency electricity delivered by the generators 11 into an electrical power having a fixed frequency which is adapted to the utility grid. In addition, the power electronic converters 13 control the output power of the electricity supplied by the wind turbines 1. Details of the power electric converters 13 will be explained later.

The individual wind turbines 1 are connected to the collector cable 15, which is typically part of an internal intermediate voltage grid 17, through filters 19 in form of reactors and transformers 21. The internal grid 17 is connected, via a substation 23 including a transformer, to a utility grid which is typically to be operated with a certain power factor requested by the utility system operator.

Figure 3:
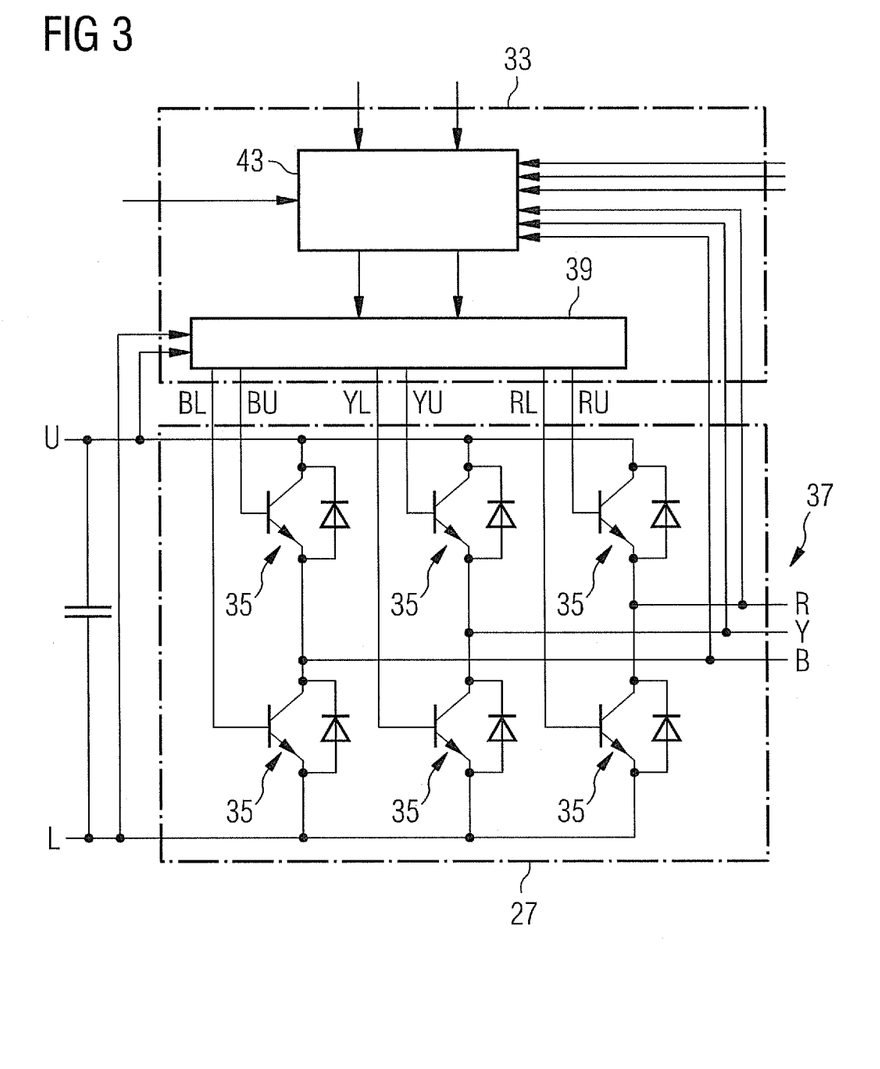
FIG. 3 shows an inverter which is part of the wind turbine electrical equipment shown in FIG. 2.

The regulation of the power output of the electricity supplied by the wind turbines will be described in conjunction with FIGS. 2 and 3. The power output is controlled by the power electronic converters 13 of the individual wind turbines 1 according to a power factor request or, alternatively, according to an active power request and a reactive power request. Each power electronic converter 13 comprises an active rectifier 25 for producing a DC voltage with a high voltage level and a low voltage level, e.g. a positive voltage level as high voltage level and a negative voltage level as low voltage level, from the variable frequency AC voltage provided by the wind turbines 1, an inverter 27 producing a nominally fixed frequency AC voltage from the DC voltage, and a DC link 29 connecting the active rectifier 25 with the inverter 27. Each power electronic converter 13 further includes a generator controller 31 which controls the torque reacted by the AC generator 11 by controlling the stator current or stator voltage of the AC generator 11, and an inverter controller 33 controlling the output current of the power electronic converter 13 to supply three-phase AC power having leading or lagging currents at an angle specified by the requested power factor.

Note that in an alternative arrangement of regulating the power output of the electricity supplied by the wind turbines a DC link voltage controller output may determine the generator Iq reference, i.e. the power or torque producing vector for the generator, and an active power reference may be fed to the network Iq reference. The network Id reference is then determined either by a reactive current reference system (may be a fixed value) or by a further ac network voltage control loop.

In the present embodiment, the inverter controller 33 receives the voltage levels on the DC link 29, the current levels at the inverter output 37, the voltage levels between the filters 19 and the transformer 21 and current control signals from a power controller 41 which generates the current demand signals according to the requested power factor. The structure of the inverter 27 and the general structure of the inverter controller 33 are shown in FIG. 3.

The inverter 27 comprises three pairs of active switching devices 35, like insulated gate bipolar transistors (IGBT), bipolar junction transistors, field effect transistors, darlington transistors or gate turn-off thyristors. In the present embodiment, each pair of active switching devices 35 includes two insulated gate bipolar transistors as active switching devices 35. The pairs of active switching devices 35 are connected between the high voltage level and the low voltage level of the DC link 29. The three lines of the inverter output 37 are each connected to a different one of the pairs of active switching devices 35, in the middle between the switching devices 35. By a suitable scheme of switching the active switching devices 35 the DC voltage on the voltage link 29 can be transformed into a three-phase AC voltage at the inverter output 37 with current levels so as to match the requested power factor. The switching is done according to pulse width modulated commutation signals provided by a pulse width modulation generator 39 which is part of the inverter 27 and which receives voltage demand signals by a current controller device 43 of the inverter controller 33.

Figure 4:
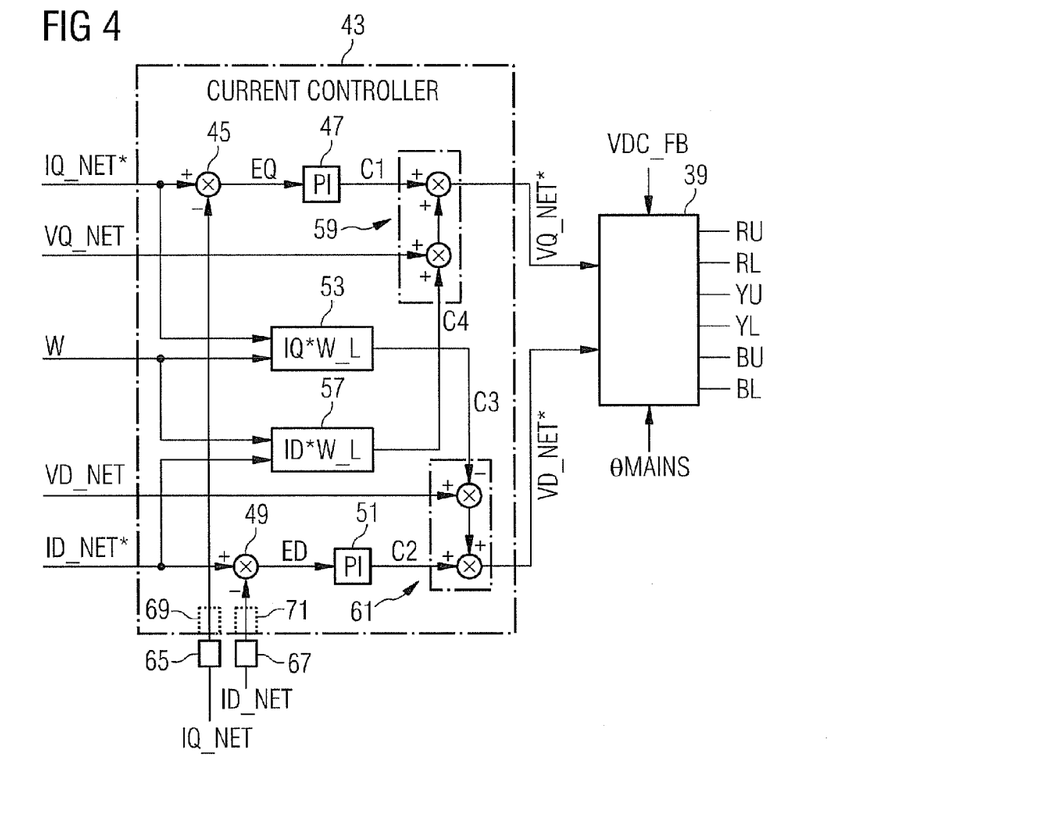
FIG. 4 shows a current controller for the inverter shown in FIG. 3.

The inverter controller is shown in FIG. 4 in greater detail. As mentioned, the inverter controller comprises a current controller device 43 and a pulse width modulation generator 39. The current controller device 43 determines voltage demand signals VQ_NET*, VD_NET* on the basis of current demand signals IQ_NET* and ID_NET*. The voltage demand signals VQ_NET* and VD_NET* are used by the pulse width modulation generator 39 to determine gate drive command signals RU, RL, YU, YL, BU and BL for the active switching devices 35 in the inverter 27 which define the switching times of the switching devices 35.

The current demand signals IQ_NET* and ID_NET* are calculated by the power controller on the basis of a power factor request. They are defined in a rotating reference frame, the so called rotating field reference frame, which rotates in synchronicity with the grid voltage. In this reference frame, a balanced three phase current can be expressed in terms of a direct axis current ID flowing in the direction of the rotating flux vector and a quadrature axis current IQ flowing in a direction perpendicular to the rotating flux vector. The two non zero current components can be transformed into the direct axis current ID and the quadrature axis current IQ by a suitable coordinate transformation. The advantage of the representation of the AC currents in form of a direct axis current ID and a quadrature axis current IQ is that, in the rotating reference frame, these two currents are represented by DC components in the steady state and the steady state error can be controlled to zero by a proportional-integral controller (PI-controller).

The current controller device 43 comprises two current demand inputs, a first current demand input for the quadrature axis current demand signal IQ_NET* and a second current demand input for the direct axis current demand signal ID_NET*, two current feedback inputs, namely a first current feedback input for the quadrature axis current feedback IQ_NET and a second current feedback input for the direct axis current feedback ID_NET. Both feedback signals can be derived by a suitable transformation from measurements of the three phases of the output current at the inverter output. Furthermore, the current controller comprises two voltage feedback inputs, namely a first voltage feedback input for the quadrature axis voltage feedback VQ_NET and a second voltage feedback input for the direct axis voltage feedback signal VD_NET. Like the current feedback signals the voltage feedback signals can be derived by using a suitable transformation from measurements of the three phases of the output voltage measured between the filter 19 and the transformer 21a. Moreover, the quadrature axis voltage feedback VQ_NET and the direct axis voltage feedback signal VD_NET my be filtered. A further input is present at the current controller 43 for receiving the frequency of the network voltage wave form.

In a first subtractor 45, the quadrature axis current feedback signal IQ_NET is subtracted from the quadrature axis current demand signal IQ_NET* to form a quadrature axis error signal EQ which is then received by a PI-controller 47 which produces a first control signal C1. Likewise, a second subtractor 49 is connected to the second current demand signal input and the second current feedback signal input for receiving the respective signals. The second subtractor 49 subtracts the direct axis current feedback signal ID_NET from the direct axis current demand signal ID_NET* to produce a direct axis error signal ED which is output to a second PI-controller 51 which determines a second control signal C2 on the basis of the direct axis error signal ED.

Furthermore, the current controller device 43 comprises a first multiplier 53 and a second multiplier 57, the first multiplier 53 being connected to the quadrature axis current demand signal input for receiving the quadrature axis current demand signal IQ_NET* and to the frequency input for receiving the frequency WN of the network voltage wave form. The first multiplier 53 multiplies the received quadrature axis current demand signal IQ_NET* by the received frequency WN and the inductivity L of the input line reactor. The result of the multiplication forms a third control signal C3. Likewise, the second multiplier 57 is connected to the direct axis current demand signal input for receiving the direct axis current demand signal ID_NET* and to the frequency input for receiving the frequency WN of the network voltage wave from. It multiplies the direct axis current demand signal ID_NET* by the received frequency WN and the inductivity L of the input line reactor to four a fourth control signal C4.

An adder arrangement 59 is connected to the first PI-controller 47 for receiving the first control signal C1, to the second multiplier 57 to receive the fourth control signal C4 and to the first voltage feedback input for receiving the quadrature axis voltage feedback signal VQ_NET. It calculates the first voltage demand signal VQ_NET* by summing the three received signals. The calculated quadrature axis voltage demand signal VQ_NET* is then output through a first voltage demand output to the pulse width modulation generator 39.

An adder/subtractor arrangement 61 is present in the current controller device 43 which is connected to the second PI-controller 51 to receive the second control signal C2, to the first multiplier 53 to receive the third control signal C3 and to the second voltage feedback input for receiving the direct axis voltage feedback signal VD_NET. It subtracts the third control signal C3 from the direct axis voltage feedback signal VD_NET and sums the result on the second control signal C2 to generate the second voltage demand signal, namely the direct axis voltage demand signal VD_NET*. The direct axis voltage demand signal VD_NET* is then output through a second voltage demand output to the pulse width modulation generator 39.

The pulse width modulation generator 39 establishes the individual switching commands for the switching devices 35 connecting the respective output lines R,Y,B of the inverter 27 to the upper or positive voltage level VU of the DC link and the lower or negative voltage level VL of the DC link though the respective switching devices 35. The individual signals RU, RL, YU, YL, BU and BL are calculated by use of the total voltage magnitude V_NET*=SQRT (VQ_NET*$^2$+ VD_NET*$^2$), the sum of the angles $\Theta_{NET}$=ARCTAN (VD_NET*/VQ_NET*) and (−)MAIN, which is a measure of the network voltage angle, and the pulse width modulation frequency, which is, for example, generated by a triangular wave generator.

Figure 5:
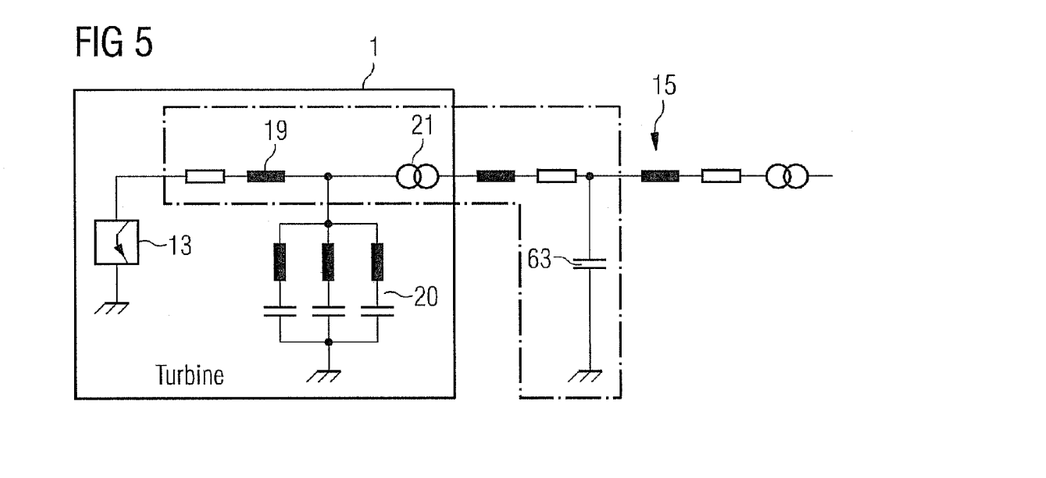
FIG. 5 shows an equivalent circuit of a wind turbine collector cable and the input line of a wind turbine.

The open loop gain of the current controller device 43 can be calculated as the product of the controller open loop gain C(s) and the admittance of the electrical network Y(s) to which the inverter output 37 is connected. A schematic equivalent circuit for a turbine connected to a collector cable 15 is shown in FIG. 5. When seen from the inverter output, the capacitance 63 of the collector cable 15 together with the input line reactor 19 and the transformer 21 form a series resonance circuit encircled by the dashed line in FIG. 5. This series resonance circuit has an impedance minimum at tuned frequency, which results in a high admittance Y(s) of the electrical network. Note, that although only one wind turbine 1 is shown in FIG. 5 which is connected to the collector cable 15 the section of the equivalent circuit representing the turbine has to be scaled by the number of turbines connected to the collector cable 15. In addition, if more than one collector cable is present the whole resonant circuit can be scaled by the number of collector cables with the respective number of turbines connected to each collector cable. This results in a reasonable representation of the system admittance.

Figure 6:
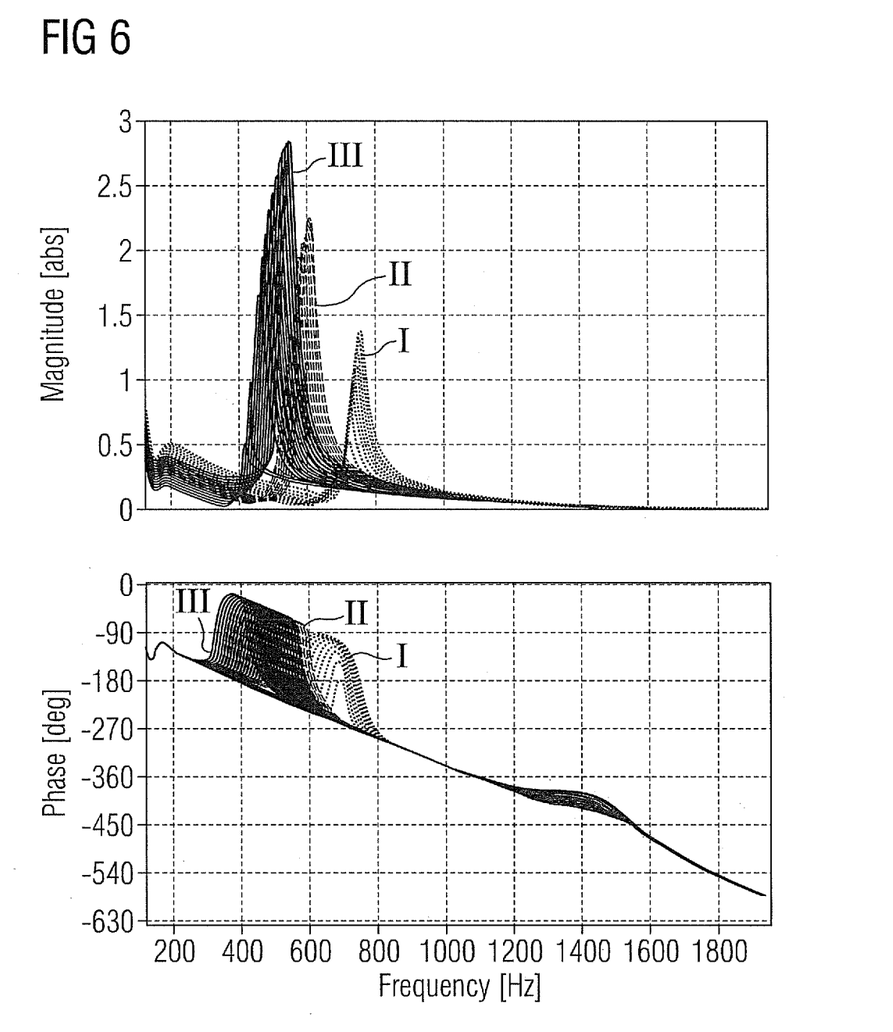
FIG. 6 shows the frequency dependent open loop control loop gain of wind farms comprising one to three collector cables with 1 to 27 wind turbines as a function of frequency.

The open loop control loop gain resulting from three different configurations is shown in FIG. 6. The upper part of FIG. 6 shows the magnitude of the open loop control loop gain and the lower part shows the phase lag between sampling the current feedback and/or voltage feedback and realising a voltage with which to control the current with (normally) the frequency of the network voltage wave form. This delay causes a phase characteristic that has increasing phase lag as frequency increases.

A control system is defined to be unstable if the magnitude of the open loop control loop gain is larger than one when the phase lag of the open loop gain is less than or equal to minus 180°. The figure shows three different scenarios, namely a first scenario (I) in which one collector cable is present with one to nine wind turbines connected to the cable, a second scenario (II) with two collector cables and one to nine wind turbines connected to each connector cable, and a third scenario RD with three collector cables and one to nine wind turbines connected to each collector cable. As can be seen from FIG. 6 depending on the number of wind turbines and/or collector cables conditions exist where the open loop gain is greater than one and the phase lag is less than −180 degree and hence are unstable.

Figure 7:
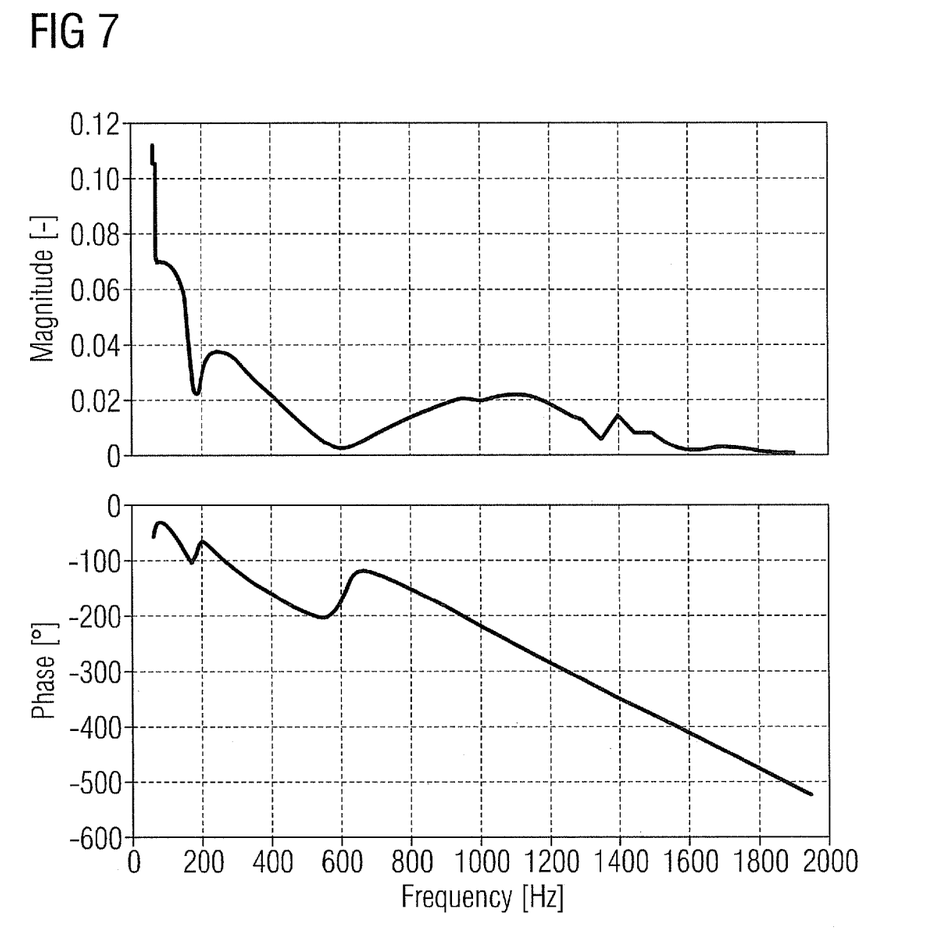
FIG. 7 shows C(s) with the notch filter in the current feedback.
Figure 8:
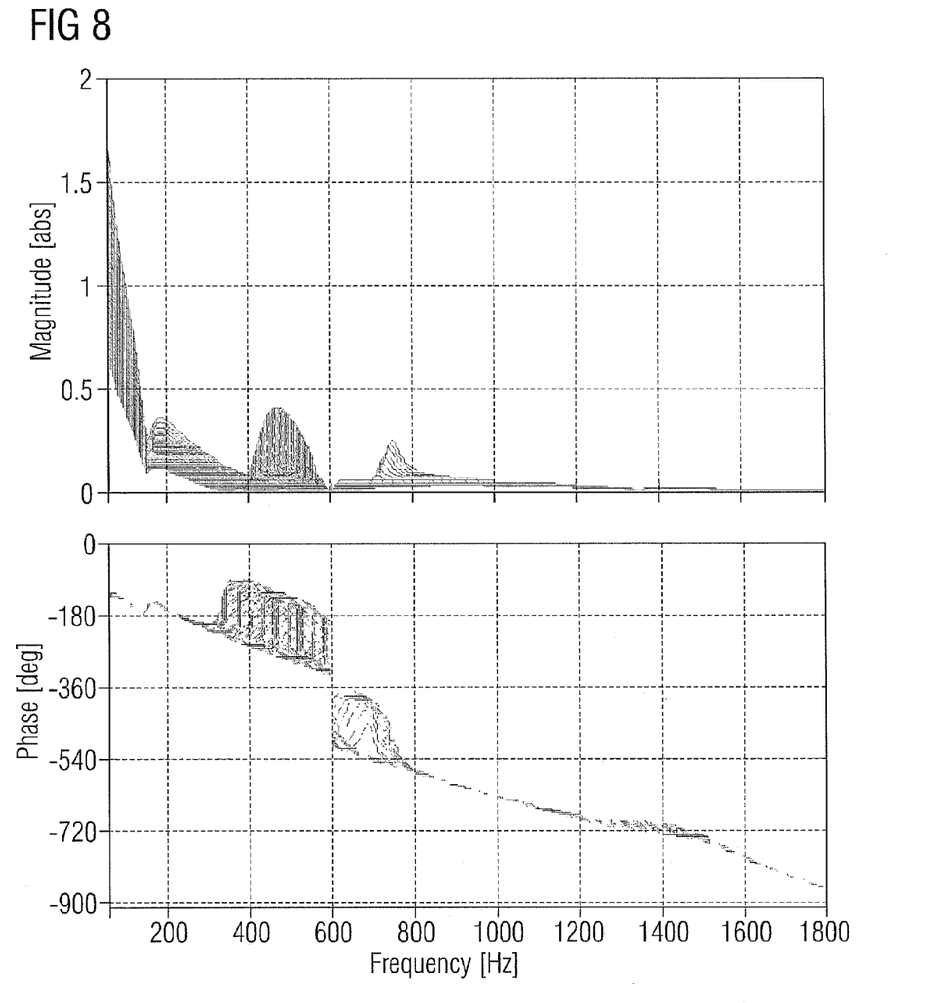
FIG. 8 shows C(s) Y(s) the complete open loop gain of the system.
Figure 9:
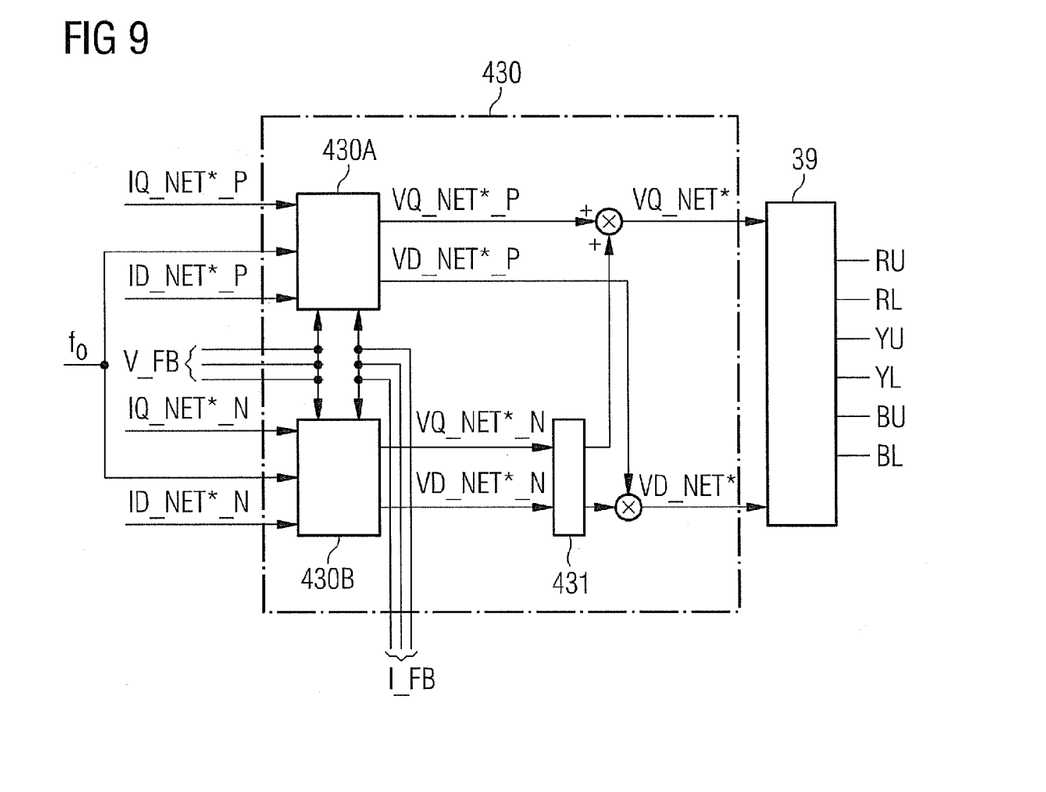
FIG. 9 shows an alternative embodiment of the inventive current controller.

To avoid the mentioned instabilities in the control systems of the wind turbines each current controller comprises a first notch filter 65 and a second notch filter 67 (see FIG. 4). The first notch filter 65 is located between the quadrature axis current feedback input and the first subtractor 45, the second notch filter 67 is located between the direct axis current feedback signal input and the second subtractor 49. The notch filters 65, 67 each have a central frequency and a band width which are chosen such according to the configuration of the wind farm that those frequencies which lead to a magnitude of the open loop control loop gain greater than one while the phase lag is less than or equal to minus 180° are suppressed. For example in case of the configuration III the centre frequency could be about 500 Hz with a band width of at least 100 Hz. In case of configuration I the centre frequency could be about 750 Hz with a band width of at least 50 Hz. The resulting magnitude and phase lag of the open loop control loop gain is shown in FIG. 9 which shows C(s) Y(s) the complete open loop gain of the system. It can be seen that the instabilities of the control systems are removed. In particular, the magnitude of the open loop control gain is well below unity throughout the whole frequency range. FIG. 7 shows C(s) with the notch filter in the current feedback. The wide band notch filter also makes this technique robust to changes in, for example, number of turbines, grid fault level and resonance frequency. The identification of the required notch filter Q factor can be determined from the frequency domain representation of the wind farm collector system and the internal turbine electrical components.

Up to now the cable capacitance on the medium voltage side of the substation 23 (see FIG. 1) has been considered. However, with larger wind farms the high voltage side of the substation, which is generally denominated as network in FIG. 1, could also lead to resonances which compromise stability and/or stability margins of the wind turbine control systems due to the creation of a second series resonance. The admittance of the electrical system of such a wind farm with a significant high voltage cable capacitance could lead to high gains which would exist close to 150 Hz and 600 Hz, both or either of which could create instabilities of the wind turbine control systems. Hence, one or more additional notch filters (69, 71) could be present for suppressing the respective frequencies. These notch filters would, for example have centre frequencies of about 150 Hz and/or 600 Hz and respective band width of at least 50 Hz. Alternatively, a single notch filter could be used for each current feedback input which has a certain centre frequency and a band width large enough to cover the frequency range between about 100 and at least 800 Hz.

With respect to FIG. 4, a current controller device has been described which uses two current demand signals IQ_NET*, ID_NET* for controlling the inverter. However, current controller devices using four current demand signals for calculating the voltage demand signals can also be used. Those current controller devices permit the decoupled control of both the positive and negative sequence components of the grid connected inverter current, this in turn offers superior fault ride through capability particularly for unbalanced fault conditions.

A controller which uses four current demand signals is schematically shown in FIG. 9. This controller is based on a phasor representation which represents the three phase currents as complex numbers of the form I/2$e^{i(\omega t + \phi)}$+I/2$e^{-i(\omega t + \phi)}$. The first summand of the sum can be represented by a direct axis part and a quadrature axis part in a reference frame rotating with the frequency of and in the same sense as the flux vector while the second part of the sum can be represented by a direct axis part and a quadrature axis part rotating with the same frequency as the flux vector but in the opposite sense. Hence, the current demand signals can be represented by a positive (rotation) quadrature axis current demand signal IQ_NET*_P, a positive (rotation) direct axis current demand signal ID_NET*_P, a negative (rotation) quadrature axis current demand signal IQ_NET*_N and a negative (rotation) direct axis current demand signal ID_NET*_N. Individual current controller device sections 430A, 430B are provided for controlling the quantities in the positive rotating frame and for controlling the quantities in the negative rotating frame. Each of the controller sections 430A, 430B corresponds in its structure to the current controller device 43 shown in FIG. 4. However, when both current controller device sections 430A, 430B are used together they both must have a notch filter tuned at twice the fundamental freq (2×f0) to reject the +ve and −ve sequence components of fundamental frequency current voltage. The notch filter which is the subject of this patent application is an additional notch filter in series with this 2×f0 notch.

The first current controller device section 430A outputs voltage demand signals of the positively rotating frame VQ_NET*_P and VD_NET*_P, and the second current controller device section 430B outputs voltage demand signals of the negatively rotating frame VQ_NET*_N and VD_NET*_N. The voltage demand signals of the negatively rotating frame VQ_NET*_N and VD_NET*_N are leveled to the voltage demand signals of the positively rotating frame VQ_NET*_P and VD_NET*_P by a levelling unit 431 and then the respective positive and leveled negative quadrature axis voltage demand signals are added to form the final quadrature axis voltage demand signal VQ_NET* which is then output to the pulse width modulation generator 39. In the same manner, the positive and the negative direct voltage axis demand signals are added to form the final direct axis voltage demand signal VD_NET* which is then output to the pulse width modulation generator 39.

What has been described with respect to the current controller device 43 also applies to each current controller device sections 430A, 430B of the current controller device 430 shown in FIG. 9. These sections are, therefore, not described in further detail in order to avoid repetitions.

The present invention, which has been described with respect to exemplary embodiments of the invention, is based on the recognition that high system admittances can act in a manner to make standard inverter control algorithms unstable. According to the invention, the used notch filters act to stabilize such systems.

While the use of notch filters in the current feedback has been described in the context of a fixed switching frequency pulse width modulation scheme, the present invention may, in general, also be beneficial in the context of variable switching frequency systems.

In addition, although the described embodiments of the invention relate to networks of wind turbines the invention is as well applicable to other types of distributed generation, or interconnection, electrical systems such as wave power machines, solar arrays, HVDC and any applications where there are power converters and capacitances in a collector system. If the electrical energy generation equipment generates DC power instead of AC power the power converters only comprise the inverters since active rectifying is not necessary.

Furthermore, a positive voltage level has been used as high voltage level and a negative voltage level has been used as low voltage level of the DC-link throughout the description of the embodiments. However, high and low voltage levels can, in general, be realised as one of the following three options:
1. The high voltage level is positive and low voltage level is also positive but less positive than the high voltage level;
2. The high voltage level is positive and the low voltage level is negative; and
3. The high voltage level is negative and low voltage level is also negative but more negative than the high voltage level.

The invention which has been described with respect to the Figures by way of illustration of specific embodiments is not only applicable in case of the power flow present in the embodiments, in which power flows from a generator to a grid, but also in cases where the power flow is reversed, e.g. in case of charging stations for electric vehicles or HVDC schemes which are supplied from electrical systems that may contain resonances.

The invention claimed is:

1. A current controller device using a vector control algorithm for controlling a conversion of a DC power into an AC power and/or vice versa by an inverter, comprising:
   a first current demand input for receiving a first current demand signal;
   a second current demand input for receiving a second current demand signal;
   a first current feedback input for receiving a first current feedback signal representing an AC current of the AC power;
   a second current feedback input for receiving a second current feedback signal representing an AC current of the AC power;
   a first voltage feedback input for receiving a first voltage feedback signal representing an AC voltage of the AC power;
   a second voltage feedback input for receiving a second voltage feedback signal representing an AC voltage of the AC power;
   a first voltage demand output for outputting a first voltage demand signal;
   a second voltage demand output for outputting a second voltage demand signal;
   a controller for producing the first voltage demand signal and the second voltage demand signal based on the first current demand signal, the second current demand signal, the first current feedback, the second current feedback, the first voltage feedback and the second voltage feedback;
   an open loop control loop gain depending on frequencies of the first and the second current feedback signals;
   a first filter provided at the first current feedback input having a first filter characteristics; and
   a second filter provided at the second current feedback input having a second filter characteristics,
   wherein the first and the second filter characteristics are configured to reduce frequencies of the first and second current feedback signals at which the frequency dependent open loop control loop gain would become greater than unity and would have a phase less than or equal to minus 180°.

2. The current controller device as claimed in claim 1, wherein the first and the second filters are band-stop filters each having a centre frequency and a band width to reduce the frequencies of the first and second current feedback signals at which the frequency dependent open loop control loop gain would become greater than unity and would have a phase less than or equal to minus 180°.

3. The current controller device as claimed in claim 2, wherein the centre frequency of the first and the second band-stop filters is above 150 Hz.

4. The current controller device as claimed in claim 3, wherein the centre frequency of the first and the second band-stop filters is above 400 Hz.

5. The current controller device as claimed in claim 4, wherein the centre frequency of the first and the second band-stop filters is above 600 Hz.

6. The current controller device as claimed in claim 2, wherein the band width of the first and the second band-stop filters is at least 50 Hz.

7. The current controller device as claimed in claim 6, wherein the band width of the first and the second band-stop filters is at least 200 Hz.

8. The current controller device as claimed in claim 1, further comprising:

a third band-stop filter provided between the first current feedback input and the first band-stop filter, and
a fourth band-stop filter provided between the second current feedback input and the second band-stop filter,
wherein the third and the fourth band-stop filters each have a centre frequency above 150 Hz and/or a band width of at least 50 Hz.

9. The current controller device as claimed in claim 5, wherein the centre frequency of the third and the fourth band-stop filters is at least 100 Hz above or below the centre frequency of the first and second band-stop filters.

10. The current controller device as claimed in claim 1, further comprising:
a first subtractor connected to the first current demand signal input and to the first current feedback input, the first subtractor being adapted for forming a first error signal representing the difference between the first current demand signal and the first current feedback signal;
a second subtractor connected to the second current demand signal input and to the second current feedback input, the second subtractor being adapted for forming a second error signal representing the difference between the second current demand signal and the second current feedback signal;
a first control unit connected to the first subtractor for receiving the first error signal and being adapted for producing a first control signal based on the first error signal;
a second control unit connected to the second subtractor for receiving the second error signal and being adapted for producing a second control signal based on the second error signal;
a first multiplier connected to the first current demand signal input and being adapted for producing a third control signal by multiplying the first current demand signal by at least a fundamental frequency and an inductance value;
a second multiplier connected to the second current demand signal input and being adapted for producing a fourth control signal by multiplying the second current demand signal by at least a fundamental frequency and an inductance value;
an adder arrangement connected to the first control unit, to the second multiplier, to the first voltage feedback input and to the first voltage demand output, the adder arrangement being adapted for producing the first voltage demand signal by adding the first control signal, the fourth control signal and the first voltage feedback signal; and
an adder/subtractor arrangement connected to the second control unit, to the first multiplier, to the second voltage feedback input and to the second voltage demand output, the adder/subtractor arrangement being adapted for producing the second voltage demand signal by subtracting the third control signal from the second voltage feedback signal and adding the second control signal,
wherein the first filter is located between the first current feedback input and the first subtractor; and
wherein the second filter is located between the second current feedback input and the second subtractor.

11. An electrical energy generating installation, comprising:
a plurality of electrical energy generating equipments each comprising:
a transformer,
a reactor,
a power converter comprising:
an inverter for converting a DC power to an AC power, and
a current controller device having an open loop control loop gain for controlling the conversion by the inverter;
a grid having a grid capacitance for connecting the electrical energy generating equipments;
forming a resonant circuit by the reactor, the transformer and the grid capacitance, wherein a tuned frequency of the resonant circuit results in a high admittance which causes the open loop control loop gain of the current controller device to become greater than unity and to have a phase less than or equal to minus 180°.

12. The electrical energy generating installation according to claim 11, wherein the grid comprises a collector cable for connecting at least a subset of the plurality of electrical energy generating equipments to a central equipment of the energy generating installation and having a cable capacitance, and wherein the grid capacitance is given by the cable capacitance.

13. The electrical energy generating installation according to claim 11, wherein each of the electrical energy generating equipments comprises an electrical generator for generating the AC power and the power converter further comprises a rectifier for the conversion of the AC power to the DC power.

14. The electrical energy generating installation according to claim 11, wherein the electrical energy generating equipments are wind turbines.

15. A vector control method for controlling a conversion of a DC power to an AC power or vice versa, comprising:
outputting/receiving the AC power from a grid;
calculating a first voltage demand signal and a second voltage demand signal based on a first current demand signal, a second current demand signal, a first current feedback, a second current feedback, a first voltage feedback and a second voltage feedback;
generating an open loop control loop gain depending on frequencies of the first and the second current feedback signals; and
selecting the frequencies of the first and the second current feedback signals at which the open loop control loop gain is greater than unity and has a phase less than or equal to minus 180° are suppressed.

16. The vector control method as claimed in claim 15, further comprising:
converting the DC power to the AC power by an inverter;
connecting at least a subset of a plurality of electrical energy generating equipments comprising reactors and transformers by a grid;
outputting the AC power to the grid having a grid capacitance and a grid impedance; and
determining the frequencies of the first and second current feedback signals from parameters of the reactors, the transformers, the grid capacitance, and the grid impedance.

17. The vector control method as claimed in claim 16, wherein the grid comprises at least a collector cable for connecting the at least a subset of the plurality of electrical energy generating equipments to a central equipment and the grid capacitance is given by a capacitance of the at least a collector cable.

18. The vector control method as claimed in claim 17, further comprising:
determining an admittance of the output of the inverter from parameters of the reactors, the transformers and the capacitance of the at least a collector cable, calculating the open loop control gain from a product of an open loop gain and the determined admittance, and determining the frequencies of the first and second current feedback signals at which the open loop control loop gain is greater than unity and has a phase less than or equal to minus 180° from a result of the calculation.

19. The vector control method as claimed in claim 16, wherein the electrical energy generating equipments generate the AC power and the AC power is converted to the DC power.

* * * * *